United States Patent [19]

Emery et al.

[11] Patent Number: 5,074,672
[45] Date of Patent: Dec. 24, 1991

[54] ARRANGEMENT FOR MONITORING TEMPERATURES OF WATER-COOLED ELECTRIC GENERATOR WINDINGS

[75] Inventors: Franklin T. Emery, Orlando, Fla.; Barry J. Mathewson, Trafford, Pa.

[73] Assignee: Westinghouse Electric Corp., Pittsburgh, Pa.

[21] Appl. No.: 603,349

[22] Filed: Oct. 26, 1990

[51] Int. Cl.⁵ .............................................. G01K 1/14
[52] U.S. Cl. .................................... 374/147; 277/26; 310/52; 310/68 C; 374/148
[58] Field of Search ................... 277/26; 374/135, 144, 374/145, 147, 148, 141; 310/52, 53, 68 C

[56] References Cited

U.S. PATENT DOCUMENTS

| | | | |
|---|---|---|---|
| 3,174,340 | 1/1991 | Britt | 374/148 |
| 3,247,715 | 4/1966 | Vlasic et al. | 374/148 X |
| 3,444,740 | 5/1969 | Davis | 374/147 X |
| 3,696,677 | 10/1972 | Luedeman | 374/147 |
| 3,873,102 | 3/1975 | Lotze et al. | 374/147 X |
| 3,894,134 | 7/1975 | Klaar | 310/53 |
| 3,894,138 | 7/1975 | Klaar | 310/53 |
| 4,211,124 | 7/1980 | Ng et al. | 374/148 X |
| 4,324,945 | 4/1982 | Sivyer | 374/148 X |
| 4,602,872 | 7/1986 | Emery et al. | 374/152 |
| 4,676,665 | 6/1987 | Twerdochlib | 374/152 |
| 4,733,225 | 3/1988 | Uematsu et al. | 340/584 |
| 4,808,867 | 2/1989 | Wichmann et al. | 310/68 C |

FOREIGN PATENT DOCUMENTS

| | | | |
|---|---|---|---|
| 862375 | 1/1953 | Fed. Rep. of Germany | 374/147 |
| 76874 | 7/1978 | Japan | 374/148 |
| 1091268 | 11/1967 | United Kingdom | 374/148 |

Primary Examiner—William A. Cuchlinski, Jr.
Assistant Examiner—G. Bradley Bennett
Attorney, Agent, or Firm—Joseph C. Spadacene

[57] ABSTRACT

An arrangement for monitoring temperature of water discharging from a plurality of water-cooled electric coils of an electric generator includes a manifold for collecting the discharging water, a plurality of hollow tubes connected in flow communication between the manifold and the respective electric coils, and a plurality of temperature sensing assemblies interposed in the respective tubes between and in series relation and flow communication with first and second portions of the hollow tubes such that the temperature sensing assemblies are thermally isolated from the manifold by the first portions of the respective tubes and electrically isolated from the respective electric coils by the second portions of the respective tubes. Each temperature sensing assembly includes an annular sleeve clamped about ends of the portions of the flow tube for receiving and connecting in flow communication the flow tube portion ends. Each sleeve has at least one well formed therein at a location between first and second tandemly-arranged axial portions of the tube for receiving and housing a transducer element. The well has an open outer end contiguous with an exterior surface and a closed inner end spaced from an interior surface of the sleeve. The transducer element can sense the temperature of the sleeve and thereby the temperature of the liquid flowing through the sleeve in contact with the interior surface thereof.

9 Claims, 4 Drawing Sheets

ARRANGEMENT FOR MONITORING TEMPERATURES OF WATER-COOLED ELECTRIC GENERATOR WINDINGS

BACKGROUND OF THE INVENTION

1. Field of the Invention

The present invention relates generally to temperature monitoring arrangements and, more particularly, is concerned with an arrangement for monitoring the temperatures of water-cooled stator windings of an electric generator.

2. Description of the Prior Art

In electric generators, such as those driven by steam turbines, a tremendous amount of heat is produced during normal operation. Some generators may weigh hundreds of tons and the unchecked production of heat in such machines as caused by mechanical and $I^2R$ losses would quickly lead to a complete generator failure.

Accordingly, the heat dissipation requirement for a generator is accomplished with a cooling system which utilizes a flow of cooling gas within the generator housing as well as within the rotor and stator structure to remove the produced heat. Some generator designs additionally flow the cooling gas through the stator coils themselves while in another design a cooling liquid such as water is passed through the stator coils for cooling purposes.

In a water cooler system, such as disclosed in U.S. Pat. No. 4,602,872 to Emery et al which is assigned to the assignee of the present invention, water is piped into a circumferential manifold coil ends by means of tubing. The water discharges from the stator coil at the opposite ends where it is collected by tubes feeding into a discharge manifold from which the water is processed and cooled for recirculation. During passage through the stator coil, the water functions to absorb generated heat.

A plurality of temperature sensors, such as thermocouples, are employed for the continuous monitoring of the cooling water to protect the generator against failure. Temperatures are typically monitored with thermocouples connected to the stator coil's coolant discharge manifold for detecting abnormally high temperatures that may result from the occurrence of an abnormal malfunction. A rise in temperature of the cooling water may be indicative of such abnormalities as a broken conductor or a coolant water flow reduction due to a partial blockage of the coolant path.

When stator coil problems develop, such as broken conductors or coolant flow reduction, abnormally high temperatures can be reached in the copper stator winding which carries the generator current. If the problem is not detected early enough, severe damage can result to the current carrying conductors. Because of the high voltages present on the stator coils, the thermocouples cannot be directly connected to the copper coil.

The current prior art method of monitoring the temperature of the coil's coolant is with thermocouples attached to each stator coil discharge water hose manifold nipple or connection. For complete protection of the generator's stator winding, a thermocouple is used to monitor each coil coolant temperature. This is a total of seventy-two points for a thirty-six slot generator. The thermocouples are mounted directly to the coolant discharge manifold, which is at ground potential. The temperature is monitored without penetration of the water system.

Because of the requirements that the thermocouple not penetrate into the water system and that it not be placed at a high voltage location, the thermocoupled is located on the connection nipple where each coil's discharge water flows to the water supply return circuit. A total water blockage to any one coil cannot be detected by a temperature change because of the thermocoupled locations. When a total water blockage occurs, no hot water from the involved coil will flow through its respective manifold nipple. The thermocouple on the nipple of the involved coil will then read the average value of the two adjacent coil thermocouples, thus indicating a normal reading.

Mixing of all coil discharge water occurs in the discharge water manifold, resulting in a large temperature gradient along the length of the manifold nipple. This temperature gradient is an important consideration when connecting the thermocouple to the nipple. Placement of each nipple thermocouple must be at the same place relative to the length of the nipple which should result in very little difference between all thermocouple readings. However, this installation accuracy is never obtained in actual practice and in conjunction with other variables, the normal build in temperature difference between thermocouples can be as much as 10° to 12° C.

The practice of using redundant thermocouples is becoming more common and closer installation tolerances are that much more important. The redundant thermocouples must be placed at the same distances along the length of the nipple in order to read as close as possible to the same temperature for the one coil.

Also, the stator water discharge manifold is exposed to the ambient temperature of the generator's hydrogen gas. Unbalance conditions in the generator coolers can cause a temperature gradient to occur on the discharge water manifold which could cause significant temperature differences in the stator coil temperature readings.

In summary, the major problems associated with the current prior art method of monitoring stator coil discharge water temperature are as follows. First, the location of the thermocouple along the length of the nipple is critical with respect to all nipples because of the temperature gradient along the nipple. Second, the nipple mounted thermocouple will not detect a change in temperature resulting from a complete blockage of water flow to a coil. Third, since the discharge water manifold is in the ambient cool gas, a hydrogen cooler unbalance condition could cause a stator coil temperature change or abnormal temperature indication. Fourth, the existing prior art method does not monitor the true temperature of the coil's discharge water because of the thermocouple's close proximity to the discharge water manifold. Fifth, placement of redundant thermocouples is very critical in order for each to read the same temperature. And, sixth, factory installation of thermocouples following generator construction makes it difficult to obtain a precise mounting of the thermocouple on the manifold nipple.

Consequently, a need still remains for an alternative way of monitoring the temperatures of water-cooled stator windings of an electric generator.

SUMMARY OF THE INVENTION

The present invention provides an improved temperature monitoring arrangement designed to satisfy the aforementioned needs. The present invention permits accurate monitoring and thus measuring of a coil's discharge water temperature through the use of a thermocouple paced in a well in a metal sleeve connected in flow communication and in series with each stator coil water discharge conduit. The thermocouple in the well is thermally isolated from the discharge water manifold and electrically isolated from the stator winding high voltage. The water discharge conduit and the sleeve with the thermocouple well can be manufactured as an assembly to obtain a more precise control over thermocouple placement resulting in a high degree of accuracy and reliability.

Accordingly, the present invention is directed to an arrangement for monitoring the temperature of liquid discharging from a plurality of water-cooled electric coils of an electric generator. The temperature monitoring arrangement includes: (a) a manifold for collecting the discharging liquid; (b) a plurality of hollow tubes connected in flow communication between the manifold and the respective electric coils; and (c) a plurality of temperature sensing assemblies interposed in the respective hollow tubes between and in flow communication and series relationship with first and second portions of the hollow tubes such that the temperature sensing assemblies are thermally isolated from the manifold by the first portions of the respective tubes and electrically isolated from the respective electric coils by the second portions of the respective tubes.

The present invention also is directed to the construction of each temperature sensing assembly. Each temperature sensing assembly includes: (a) an annular sleeve having exterior and interior surfaces and first and second tandemly-arranged axial portions for receiving and connecting in flow communication the ends of the first and second portions of the hollow tube, each sleeve having at least one well formed therein at a location between the first and second axial portions, the well having an open outer end contiguous with the exterior surface and a closed inner end spaced from the interior surface of the sleeve; (b) a transducer element disposed in the well of the sleeve and attached in heat transfer relation with the sleeve for sensing the temperature of the sleeve and thereby the temperature of the liquid flowing through the sleeve in contact with the interior surface thereof; (c) means for sealably clamping the ends of the hollow tube portions over first and second axial portions of the sleeve; and (d) electrical signal transmitting means such as an electrical conductor connected to the transducer element and extending from the assembly between one of the tube portions and the clamping means.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
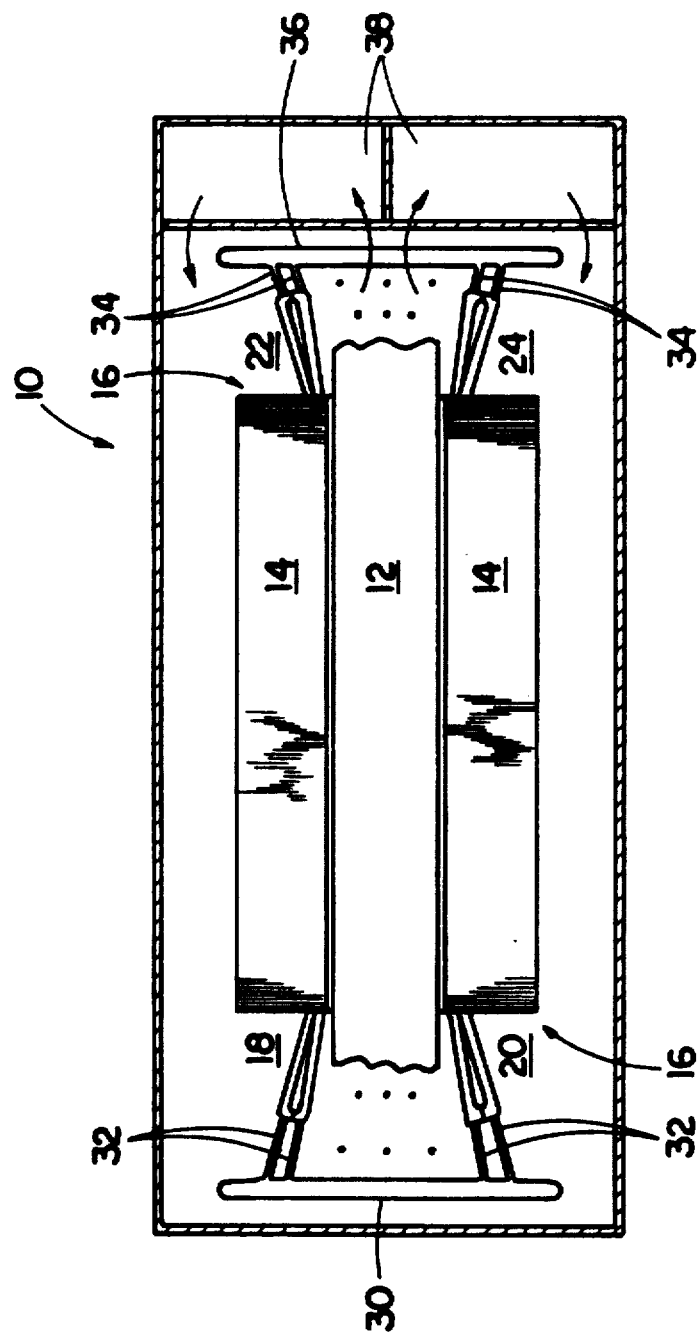
FIG. 1 is a simplified sectional view of a prior art electric generator having water-cooled windings.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a prior art electric generator 10 which includes a rotor 12 (a portion of which is illustrated) and a stator core 14 having a plurality of slots for receiving stator windings, or coils 16. For simplicity sake, only four coil sections 18, 20, 22 and 24 are illustrated. The sections 18, 20, 22, 24 extend out of the stator core 14 with each of the sections being comprised of a bottom half coil 26 positioned in the bottom of one stator slot and connected to a top half coil 28 positioned in the top of a different one of such slots.

Inlet cooling water is supplied to an inlet manifold 30 which distributes the water to the sections 18, 20, 22, 24 of the half coils 26, 28 by means of inlet tubes 32. After passage through the respective coil sections, the water is provided, via respective discharge tubes 34, to a discharge manifold 36 from which the water is processed and cooled for recirculation.

The generator 10 is additionally cooled by means of gas flow, such as hydrogen, indicated by the dotted arrows emanating from, and returning to, heat exchangers 38. The cooling gas is also supplied to apertures within the rotor 12 and stator core 14 for additional cooling.

Figure 2:
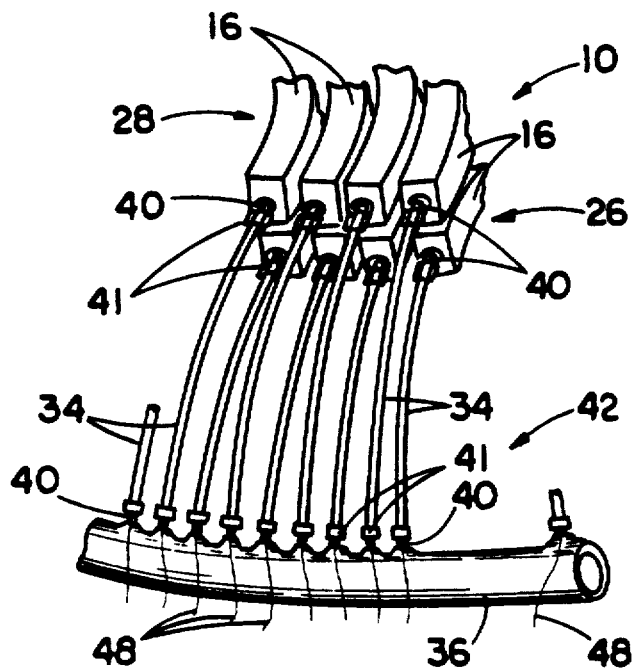
FIG. 2 is a fragmentary perspective view of a prior art temperature monitoring arrangement employed with the prior art electric generator of FIG. 1.

Referring to FIG. 2, the discharge tubes 34 interconnect the bottom and top half coils 26, 28 to the discharge manifold 36 by nipples 40 connected on and projecting from both the ends of the half coils 26, 28 and the discharge manifold 36. The opposite ends of the discharge tubes 34 are connected by connectors 41 to the respective nipples 40. The discharge manifold 36 actually extends 360° around the interior of the generator 10 and although eight half coils 26, 28 are illustrated, a typical generator may have forty-eight slots for a total of ninety-six half coils.

Prior Art Temperature Monitoring Arrangement

Figure 3:
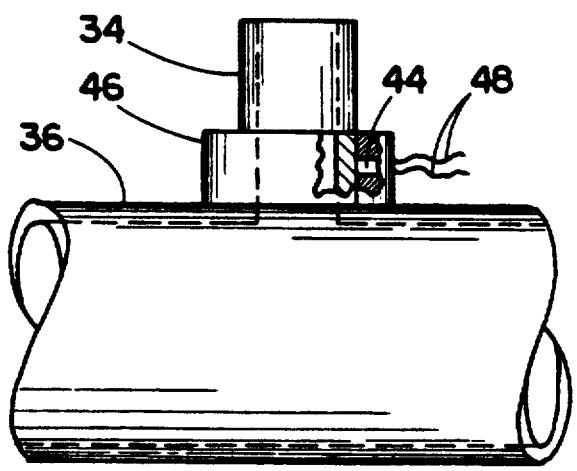
FIG. 3 is an enlarged view of the mounting of one thermocouple of the prior art monitoring arrangement of FIG. 2.

Referring to FIGS. 2 and 3, a prior art temperature monitoring arrangement 42 is associated with the discharge tube 34 and nipples 40. More particularly, the monitoring arrangement 42 includes a plurality of temperature sensors 44 (only one being shown in FIG. 3), such as thermocouples, surrounded by insulators 46 (only one being shown in FIG. 3) provided on the nipples 40 of the discharge manifold 36 to monitor the temperature of the water discharged in tubes 34. Other components of the prior art temperature monitoring arrangement 42 for scanning the thermocouples 44 and receiving and processing their signals are fully described and illustrated in abovecited U.S. Pat. No. 4,602,872.

As best seen in FIG. 3, there is one thermocouple 44, insulator 46 and conductor lead 48 provided for each discharge tube 34 and nipple 40. Each conductor lead 48 extends from one thermocouple 44 through the respective one insulator 46 which mounts the thermocouple 44 to the nipple 40. The leads 48 are brought to a location (not shown) outside of the generator 10 where the voltages of the thermocouples 44 may be read.

As described earlier, the prior art temperature monitoring arrangement 42 does not function satisfactorily. A total water blockage to any one coil cannot be detected by a temperature change because of the locations of the thermocouples 44. When a total water blockage occurs, no hot water from the involved coil will flow through its respective manifold nipple 40. The thermocouple 44 on the nipple 40 of the involved coil will then sense the average value of the two adjacent coil thermocouples, thus erroneously leading to a normal reading.

Temperature Monitoring Arrangement of Invention

Figure 4:
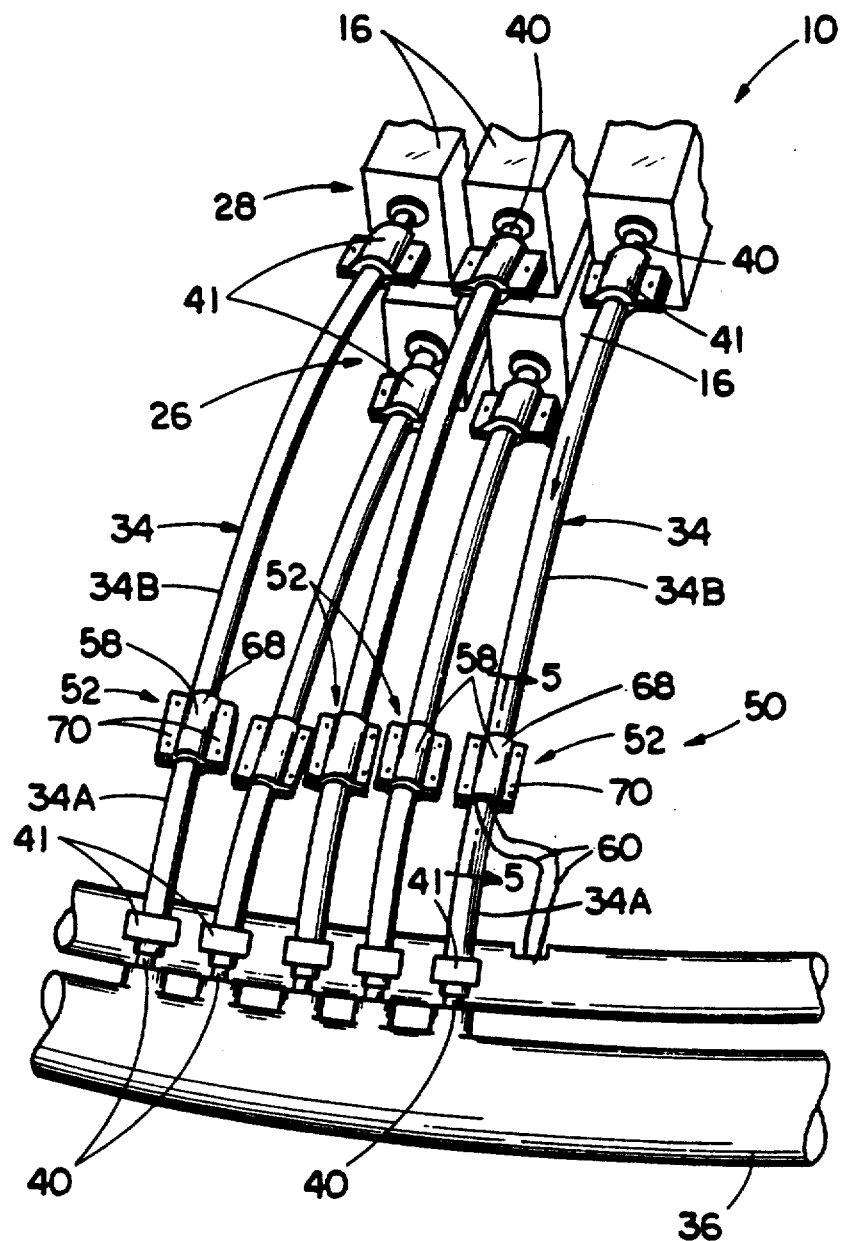
FIG. 4 is a fragmentary perspective view of a temperature monitoring arrangement having a plurality of temperature sensing assemblies of the present invention being employed with the prior art electric generator.

Referring to FIG. 4, there is illustrated a temperature monitoring arrangement 50 in accordance with the present invention. To obtain a more accurate and more sensitive monitoring and thereby measuring of the actual coil discharge water temperature, the arrangement 50 of the present invention includes a plurality of temperature sensing assemblies 52 interposed in the respective hollow discharge tubes 34 extending between the bottom and top half coils 26, 28 and the discharge manifold 36.

The hollow discharge tubes 34 are provided in separate first and second portions 34A, 34B. The temperature sensing assemblies 52 are disposed between and in flow communication and series relationship with the first portions 34A and the second portions 34B of the hollow discharge tubes 34. Relative to the direction of water flow and positions of the assemblies 34, the first tube portions 34A are located downstream and the second tube portions 34B are located upstream from the temperature sensing assemblies 52. The temperature sensing assemblies 52 are thus thermally isolated from the discharge manifold 36 by the lengths of the first portions 34A of the respective discharge tubes 34 and electrically isolated from the respective electric coils 16 by the lengths of the second portions 34B of the respective discharge tubes 34.

Figure 5:
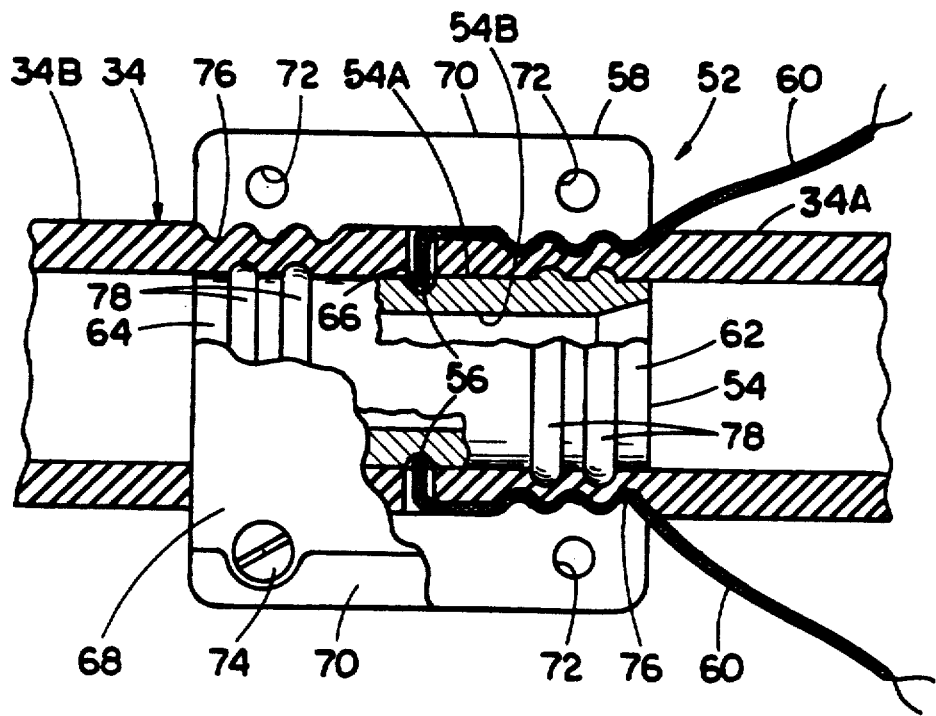
FIG. 5 is an axial sectional view of one of the temperature sensing assemblies of the present invention taken alone line 5—5 of FIG. 4.
Figure 6:
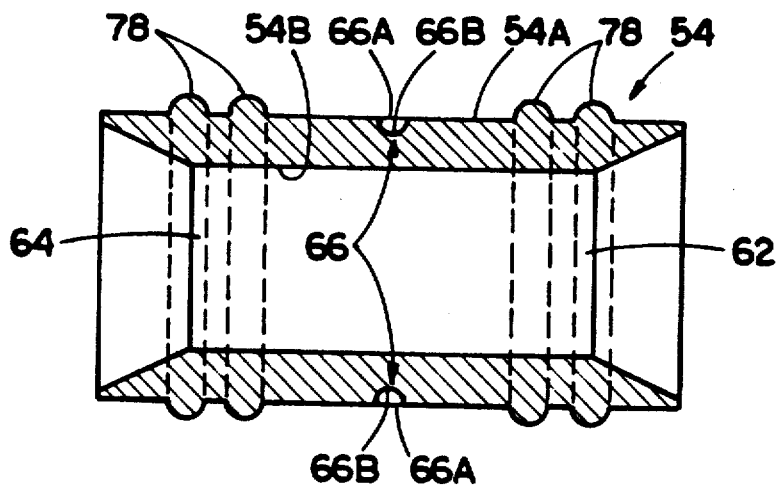
FIG. 6 is an axial sectional view of a metal thermocouple well of the temperature sensing assembly of FIG. 5.

Referring to FIGS. 5 and 6, each temperature sensing assembly 52 of the arrangement 50 is composed of an annular sleeve 54, at least one transducer element 56, a clamping means 58, and electrical signal transmitting means 60. The annular sleeve 54 is composed of a metal material, such as stainless steel. The sleeve 54 has exterior and interior surfaces 54A and 54B, and first and second, substantially identical and tandemly-arranged, axial portions 62 and 64 having bevel shaped opposite ends. As seen in FIG. 5, the outside diameter of the sleeve 54 at its exterior surface 54A is less than the inside diameters of the ends of the first and second portions 34A, 34B of the discharge tube 34 at their interior surfaces such that the axial portions 62, 64 can be received within and connect in flow communication the ends of the first and second portions 34A, 34B of the discharge tube 34. The sleeve 54 has at least one and preferably a pair of wells 66 formed therein at circumferentially opposing locations between the first and second axial portions 62, 64. Each well 66 has an open outer end 66A contiguous with the exterior surface 54A and a closed inner end 66B spaced from the interior surface 54B of the sleeve 54.

One transducer element 56, such as a thermocouple, of the assembly 52 is disposed in each of the wells 66 of the sleeve 54. The thermocouple 56 is attached, such as by brazing, in heat transfer relation with the metal sleeve 54 for sensing the temperature of the sleeve 54 and thereby the temperature of the cooling water flowing through the sleeve 54 in contact with its interior surface 54B. Two wells 66 and thermocouples 56 are provided in each assembly 52 for purposes of redundancy. They both should be reading the same temperature.

The clamping means 58 of the assembly 52 is preferably a clamp formed by a pair of identical semicylindrical bodies 68. Each clamp body 68 has a pair of flanges 70 attached along its opposite axially extending edges with holes 72 therein being aligned with one another when the clamp bodies 68 are placed together. The aligned holes 72 are threaded to receive fasteners 74 in order to sealably clamp the ends of the first and second portions 34A, 34B of the discharge tube 34 over first and second axial portions 62, 64 of the sleeve 54.

Circumferential ribs 76, 78 are respectively formed in the clamp bodies 68 and in the first and second axial portions 62, 64 of the sleeve 54. The ribs 76, 78 mate together when the clamp bodies 68 are fastened together. The electrical signal transmitting means 60 are preferably pairs of electrical conductors connected to each of the thermocouples 56 disposed in each well 66. The conductors 60 extend from the assembly 52 between one of the discharge tube portions 34A, 34B and the clamp 58 to other components of the arrangement 50 (not shown).

Other components of the temperature monitoring arrangement 50 for scanning the thermocouples 56 of the temperature sensing assemblies 52 and receiving and processing their signals can be the same as the components described and illustrated in above-cited U.S. Pat. No. 4,602,872, the disclosure of which is hereby incorporated by reference. These other components need not be described herein for gaining a complete and thorough understanding of the plurality of temperature sensing assemblies 52 of the present invention.

The temperature sensing assemblies 52 have several advantages. First, they allow fabrication with the tube portions 34A, 34B as a subassembly permitting better quality of thermocouple installation.

Second, a complete water blockage to a coil 16 can be detected by comparing each thermocouple reading with the ambient hydrogen gas temperature and the average of all thermocouple readings. For example, if a particular coil's temperature is in question, the following calculations can be made to determine if a problem exists: (a) compare the actual coil temperature with average temperature (meaning average of all coils' water temperature); if actual coil temperature is equal to average temperature, assume actual coil temperature is okay; (b) if actual coil temperature is greater than average temperature, compare the hydrogen gas temperature with the average temperature; if the hydrogen gas temperature is less than the average temperature, assume a hot coil is present; if the actual coil temperature is less than average temperature, compare the hydrogen gas temperature with the average temperature; if the hydrogen gas temperature is less than the average temperature, compare the actual coil temperature with the hydrogen gas temperature; if the actual coil temperature equals the hydrogen gas temperature, this indicates that water flow to the coil is blocked.

Third, the present invention provides means to measure the actual discharge water temperature and provides increased sensitivity of detecting a hot coil.

Fourth, there is less influence on coil temperature measurements from cooling gas temperature differences.

Fifth, the invention permits provision of the redundant thermocouples as a matched pair.

Sixth, replacement of the thermocouples is easier because the complete assembly can be replaced if necessary.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An assembly for sensing temperature of a liquid flowing through a hollow flow tube having first and second tube portions and an interior surface, said temperature sensing assembly comprising:

(a) an annular sleeve having exterior and interior surfaces and first and second tandemly-arranged axial portions, said sleeve having an outside diameter at its exterior surface which is less than an inside diameter of the flow tube at its interior surface such that said sleeve is insertable through ends of the first and second flow tube portions into the interior of the first and second flow tube portions for interconnecting in flow communication the ends of the first and second portions of the flow tube, said sleeve having at least one well formed therein at a location between said first and second axial portions, said well having an open outer end contiguous with said exterior surface and a closed inner end spaced from said interior surface;

(b) a transducer element disposed in said well of said sleeve and attached in heat transfer relation with said sleeve for sensing the temperature of said sleeve and thereby the temperature of the liquid flowing through said sleeve in contact with said interior surface thereof;

(c) means disposable over the ends of the first and second portions of the flow tube on the exterior of the first and second flow tube portions for sealably clamping the ends of the flow tube portions over said exterior surfaces of said first and second axial portions of said sleeve; and (d) means for transmitting electrical signals being connected to said transducer element and extending from said assembly between one of the flow tube portions and said clamping means.

2. The assembly as recited in claim 1, wherein said sleeve has a pair of said wells formed therein at circumferentially opposing locations between said first and second axial portions of said sleeve.

3. The assembly as recited in claim 2, wherein said transducer element is a thermocouple disposed within each of said wells.

4. The assembly as recited in claim 1, wherein said clamping means is a pair of semi-cylindrical clamp bodies being fastenable together about said first and second axial portions of said sleeve with the ends of the tube portions therebetween.

5. The assembly as recited in claim 1, wherein said clamp bodies and first and second axial portions of said sleeve having respective circumferential ribs thereon being matable together when said clamp bodies are fastened together.

6. An arrangement for monitoring temperature of liquid discharging from a plurality of watercooled electric coils of an electric generator, said temperature monitoring arrangement comprising:

(a) a manifold for collecting the discharging liquid;

(b) a plurality of hollow tubes connected in flow communication between said manifold and said respective electric coils, each said tube having an interior surface; and (c) a plurality of temperature sensing assemblies interposed in said respective hollow tubes between and in flow communication and series relationship with first and second portions of said hollow tubes such that said temperature sensing assemblies are thermally isolated from said manifold by said first portions of said respective tubes and electrically isolated from said respective electric coils by said second portions of said respective tubes, each of said temperature sensing assemblies including (i) an annular sleeve having exterior and interior surfaces and first and second tandemly-arranged axial portions, said sleeve having an outside diameter at its exterior surface which is less than an inside diameter of the flow tube at its interior surface such that said sleeve is insertable through ends of the first and second portions of one of said tubes into the interior of the first and second tube portions for interconnecting in flow communication the ends of said first and second portions of said tube, said sleeve having at least one well formed therein at a location between said first and second axial portions, said well having an open outer end contiguous with said exterior surface and a closed inner end spaced from said interior surface, (ii) a transducer element disposed in said well of said sleeve and attached in heat transfer relation with said sleeve for sensing the temperature of said sleeve and thereby the temperature of the liquid flowing through said sleeve in contact with said interior surface thereof, (iii) means disposable over the ends of said first and second portions of said tube on the exterior of said first and second tube portions for sealably clamping the ends of said tube portions over said exterior surfaces of said first and second axial portions of said sleeve, and (iv) means for transmitting electrical signal being connected to said transducer element and extending from said assembly between one of said tube portions and said clamping means.

7. The arrangement as recited in claim 6, wherein each said sleeve has a pair of said wells formed therein at circumferentially opposing locations between said first and second axial portions of said sleeve.

8. The arrangement as recited in claim 7, wherein each said assembly also includes a transducer element disposed in each of said wells of said sleeve and attached in heat transfer relation with said sleeve for sensing the temperature of said sleeve and thereby the temperature of the liquid flowing through said sleeve in contact with said interior surface thereof.

9. The arrangement as recited in claim 8, wherein said transducer element is a thermocoupled disposed within each of said wells.

* * * * *